(12) United States Patent
Akama

(10) Patent No.: US 9,974,100 B2
(45) Date of Patent: May 15, 2018

(54) IN-VEHICLE UNIT, COMMUNICATION SYSTEM, COMMUNICATION METHOD, AND PROGRAM

(71) Applicant: HONDA MOTOR CO., LTD., Tokyo (JP)

(72) Inventor: Shinichi Akama, Cupertino, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 14/913,908

(22) PCT Filed: May 28, 2014

(86) PCT No.: PCT/JP2014/064170
§ 371 (c)(1),
(2) Date: Feb. 23, 2016

(87) PCT Pub. No.: WO2015/029522
PCT Pub. Date: Mar. 5, 2015

(65) Prior Publication Data
US 2016/0205707 A1 Jul. 14, 2016

(30) Foreign Application Priority Data
Aug. 30, 2013 (JP) .................... 2013-180270

(51) Int. Cl.
*H04W 76/02* (2009.01)
*H04M 1/725* (2006.01)
(Continued)

(52) U.S. Cl.
CPC ......... *H04W 76/02* (2013.01); *H04M 1/7253* (2013.01); *H04M 1/72525* (2013.01);
(Continued)

(58) Field of Classification Search
CPC ..... H04W 76/02; H04W 4/003; H04W 88/02; H04M 1/7253; H04M 1/72525; H04M 1/6075
See application file for complete search history.

(56) References Cited

U.S. PATENT DOCUMENTS

2008/0147410 A1 6/2008 Odinak
2008/0234924 A1* 9/2008 Katou ................ G01C 21/3688
701/532
(Continued)

FOREIGN PATENT DOCUMENTS

CN 102323816 A 1/2012
DE 102012008284 A1 11/2012
(Continued)

OTHER PUBLICATIONS

International Search Report dated Aug. 19, 2014, issued in counterpart Application No. PCT/JP2014/064170 (1 page).
(Continued)

*Primary Examiner* — Chuong A Ngo
(74) *Attorney, Agent, or Firm* — Westerman, Hattorri, Daniels & Adrian, LLP

(57) ABSTRACT

This in-vehicle unit includes: a vehicle-side communication portion; a mobile-side communication portion; a communicator-side communication portion; a connection determination portion; and a communication control portion that, if both of a mobile terminal and a communicator are determined to be in a connected state by the connection determination portion, performs control so as to send information related to a motor vehicle, which has been received by the vehicle-side communication portion, preferentially to the mobile terminal.

3 Claims, 4 Drawing Sheets

(51) Int. Cl.
*H04W 4/00* (2018.01)
*H04W 88/02* (2009.01)
*H04M 1/60* (2006.01)

(52) U.S. Cl.
CPC .......... *H04W 4/003* (2013.01); *H04M 1/6075* (2013.01); *H04W 88/02* (2013.01)

(56) References Cited

U.S. PATENT DOCUMENTS

| | | | | |
|---|---|---|---|---|
| 2011/0093161 | A1* | 4/2011 | Zhou | B60W 50/08 701/31.4 |
| 2012/0105637 | A1 | 5/2012 | Yousefi et al. | |
| 2013/0005258 | A1* | 1/2013 | Uefuji | H04M 1/72527 455/41.2 |
| 2013/0143546 | A1* | 6/2013 | Ricci | G06F 9/54 455/420 |

FOREIGN PATENT DOCUMENTS

| | | |
|---|---|---|
| JP | 2004-301568 A | 10/2004 |
| JP | 2007-36935 A | 2/2007 |
| JP | 2009-152922 A | 7/2009 |

OTHER PUBLICATIONS

Office Action dated Jun. 2, 2017, issued in counterpart Chinese Patent Application No. 201480044164.2, with Partial English translation of the Search Report. (9 pages).

Extended (supplementary) European Search Report dated May 12, 2017, issued in counterpart European Patent Application No. 14839863.9. (12 pages).

\* cited by examiner

IN-VEHICLE UNIT, COMMUNICATION SYSTEM, COMMUNICATION METHOD, AND PROGRAM

TECHNICAL FIELD

The present invention relates to an in-vehicle unit, a communication system, a communication method, and a program.

The present application claims priority based on Japanese Patent Application No. 2013-180270 filed on Aug. 30, 2013, the contents of which are incorporated herein by reference.

BACKGROUND

An Electric Control Unit (ECU) mounted in a motor vehicle is used to obtain information related to a trouble of the motor vehicle.

Furthermore, a mobile phone terminal is under study that communicates with an ECU, collects information related to a trouble of a motor vehicle, and analyzes the trouble of the motor vehicle based on the collected information (see Patent Document 1).

RELATED ART DOCUMENT

Patent Document

Patent Document 1: Japanese Unexamined Patent Application, First Publication No. 2007-36935

SUMMARY

Problems to be Solved by the Invention

However, it is required that the simplicity and usability of an in-vehicle unit such as a display device that is mounted in a motor vehicle be further improved.

The present invention has been achieved to solve the aforementioned problem. It is an object of the present invention to provide an in-vehicle unit, a communication system, a communication method, and a program that are capable of improving the simplicity and usability of an in-vehicle unit such as a display device that is mounted in a motor vehicle.

Means for Solving the Problem

Aspects of the present invention have the following configurations.

(1) An in-vehicle unit according to a first aspect of the present invention includes: a vehicle-side communication portion that receives information related to a motor vehicle; a mobile-side communication portion that is connected to and communicates with a mobile terminal with a function of analyzing information related to a motor vehicle; a communicator-side communication portion that is connected to and communicates with a predetermined communicator; a connection determination portion that determines a connection state of the mobile terminal and a connection state of the communicator; and a communication control portion that performs control so as to send the information related to the motor vehicle, which has been received by the vehicle-side communication portion, preferentially to the mobile terminal if both of the mobile terminal and the communicator are determined to be in a connected state by the connection determination portion.

As a result, the in-vehicle unit does not need to be provided with a function of analyzing information related to a motor vehicle, and hence, it is possible to improve the simplicity of the in-vehicle unit such as a display device that is to be mounted in the motor vehicle. Furthermore, the in-vehicle unit automatically determines the connection states and controls the communication according to the result of the determination. Therefore, it is possible to improve the usability by the user.

(2) The in-vehicle unit as set forth above in (1) may further include: an output portion that outputs, to a user, information related to an analysis result of the information related to the motor vehicle, which has been received from the mobile terminal, by means of the mobile-side communication portion.

As a result, it is possible to notify the user (a driver of the motor vehicle, by way of example) of information related to the analysis result of the information related to the motor vehicle.

(3) In the in-vehicle unit as set forth above in (1) or (2), the communication control portion may perform control so as to send the information related to the motor vehicle, which has been received by the vehicle-side communication portion, to the communicator if the mobile terminal is determined to be in a non-connected state and the communicator is determined to be in a connected state by the connection determination portion.

As a result, the in-vehicle unit automatically determines the connection states and controls the communication according to the result of the determination. Therefore, it is possible to improve the usability by the user.

(4) A communication system according to a second aspect of the present invention includes: an in-vehicle unit; a mobile terminal; and a predetermined communicator, wherein the in-vehicle unit determines a connection state of the mobile terminal and a connection state of the communicator, and sends information related to a motor vehicle preferentially to the mobile terminal if both of the mobile terminal and the communicator are determined to be in a connected state, and sends the information related to the motor vehicle to the communicator if the mobile terminal is determined to be in a non-connected state and the communicator is determined to be in a connected state, wherein the mobile terminal analyzes the information related to the motor vehicle, which has been received from the in-vehicle unit, and sends information related to an analysis result thereof to the in-vehicle unit, and sends the information related to the motor vehicle, which has been received from the in-vehicle unit, or the information related to the analysis result thereof to a predetermined information collection device, and wherein the communicator sends the information related to the motor vehicle, which has been received from the in-vehicle unit, to a predetermined communicator-side device that is provided on a side of the information collection device.

As a result, the in-vehicle unit does not need to be provided with a function of analyzing information related to a motor vehicle, and hence, it is possible to improve the simplicity of the in-vehicle unit such as a display device that is to be mounted in the motor vehicle. Furthermore, the in-vehicle unit automatically determines the connection states and controls the communication according to the result of the determination. Therefore, it is possible to improve the usability by the user.

(5) In the communication system as set forth above in (4), the mobile terminal may download an application with a function of analyzing the information related to the motor vehicle from a predetermined mobile system device, to thereby update the application.

As a result, it is possible to make, in a simplified manner, addition, modification, or the like (update) the function of analyzing information related to the motor vehicle.

(6) In a communication method according to a third aspect of the present invention, a vehicle-side communication portion provided in an in-vehicle unit receives information related to a motor vehicle; a connection determination portion provided in the in-vehicle unit determines a connection state of a mobile terminal with a function of analyzing information related to a motor vehicle and a connection state of a predetermined communicator; and a communication control portion provided in the in-vehicle unit performs control so as to send the information related to the motor vehicle, which has been received by the vehicle-side communication portion, preferentially to the mobile terminal if both of the mobile terminal and the communicator are determined to be in a connected state by the connection determination portion.

As a result, the in-vehicle unit does not need to be provided with a function of analyzing information related to a motor vehicle, and hence, it is possible to improve the simplicity of the in-vehicle unit such as a display device that is to be mounted in the motor vehicle. Furthermore, the in-vehicle unit automatically determines the connection states and controls the communication according to the result of the determination. Therefore, it is possible to improve the usability by the user.

(7) A program according to a fourth aspect of the present invention causes a computer to execute: a step in which a vehicle-side communication portion receives information related to a motor vehicle; a step in which a connection determination portion determines a connection state of a mobile terminal with a function of analyzing information related to a motor vehicle and a connection state of a predetermined communicator, and a step in which a communication control portion performs control so as to send the information related to the motor vehicle, which has been received by the vehicle-side communication portion, preferentially to the mobile terminal if both of the mobile terminal and the communicator are determined to be in a connected state by the connection determination portion.

As a result, the in-vehicle unit does not need to be provided with a function of analyzing information related to a motor vehicle, and hence, it is possible to improve the simplicity of the in-vehicle unit such as a display device that is to be mounted in the motor vehicle. Furthermore, the in-vehicle unit automatically determines the connection states and controls the communication according to the result of the determination. Therefore, it is possible to improve the usability by the user.

Advantage of the Invention

According to the in-vehicle unit as set forth above in (1), if both of the mobile terminal with a function of analyzing information related to a motor vehicle and the predetermined communicator are determined to be in a connected state, the in-vehicle unit performs control so as to send the information related to the motor vehicle preferentially to the mobile terminal. Thereby, it is possible to improve the simplicity and usability of the in-vehicle unit such as a display device that is mounted in the motor vehicle.

According to the in-vehicle unit as set forth above in (2), information related to an analysis result of the information related to the motor vehicle, which has been received from the mobile terminal, is output to the user. Thereby, it is possible to notify the user of the information related to the analysis result of the information related to the motor vehicle.

According to the in-vehicle unit as set forth above in (3), if the mobile terminal is determined to be in a non-connected state and the communicator is determined to be in a connected state, the in-vehicle unit performs control so as to send the information related to the motor vehicle to the communicator. Thereby, it is possible to improve the usability by the user.

According to the communication system as set forth above in (4), in the in-vehicle unit, if both of the mobile terminal and the predetermined communicator are determined to be connected to the in-vehicle unit, control is performed so as to send the information related to the motor vehicle preferentially to the mobile terminal. Thereby, it is possible to improve the simplicity and usability of the in-vehicle unit such as a display device that is mounted in the motor vehicle.

According to the communication system as set forth above in (5), the mobile terminal downloads an application with a function of analyzing the information related to the motor vehicle from a predetermined mobile system device, to thereby update the application. Thus, it is possible to make, in a simplified manner, addition, modification, or the like (update) of the function of analyzing the information related to the motor vehicle.

According to the communication method as set forth above in (6), in the in-vehicle unit, if both of the mobile terminal with a function of analyzing information related to a mobile vehicle and the predetermined communicator are determined to be connected to the in-vehicle unit, control is performed so as to send the information related to the motor vehicle preferentially to the mobile terminal. Thereby, it is possible to improve the simplicity and usability of the in-vehicle unit such as a display device that is mounted in the motor vehicle.

According to the program as set forth above in (7), in the in-vehicle unit, if both of the mobile terminal with a function of analyzing information related to a mobile vehicle and the predetermined communicator are determined to be connected to the in-vehicle unit, control is performed so as to send the information related to the motor vehicle preferentially to the mobile terminal. Thereby, it is possible to improve the simplicity and usability of the in-vehicle unit such as a display device that is mounted in the motor vehicle.

DESCRIPTION OF THE EMBODIMENTS

Hereunder is a description of an embodiment of the present invention with reference to the drawings.
[Outline of Communication System According to Present Embodiment]

Figure 1:
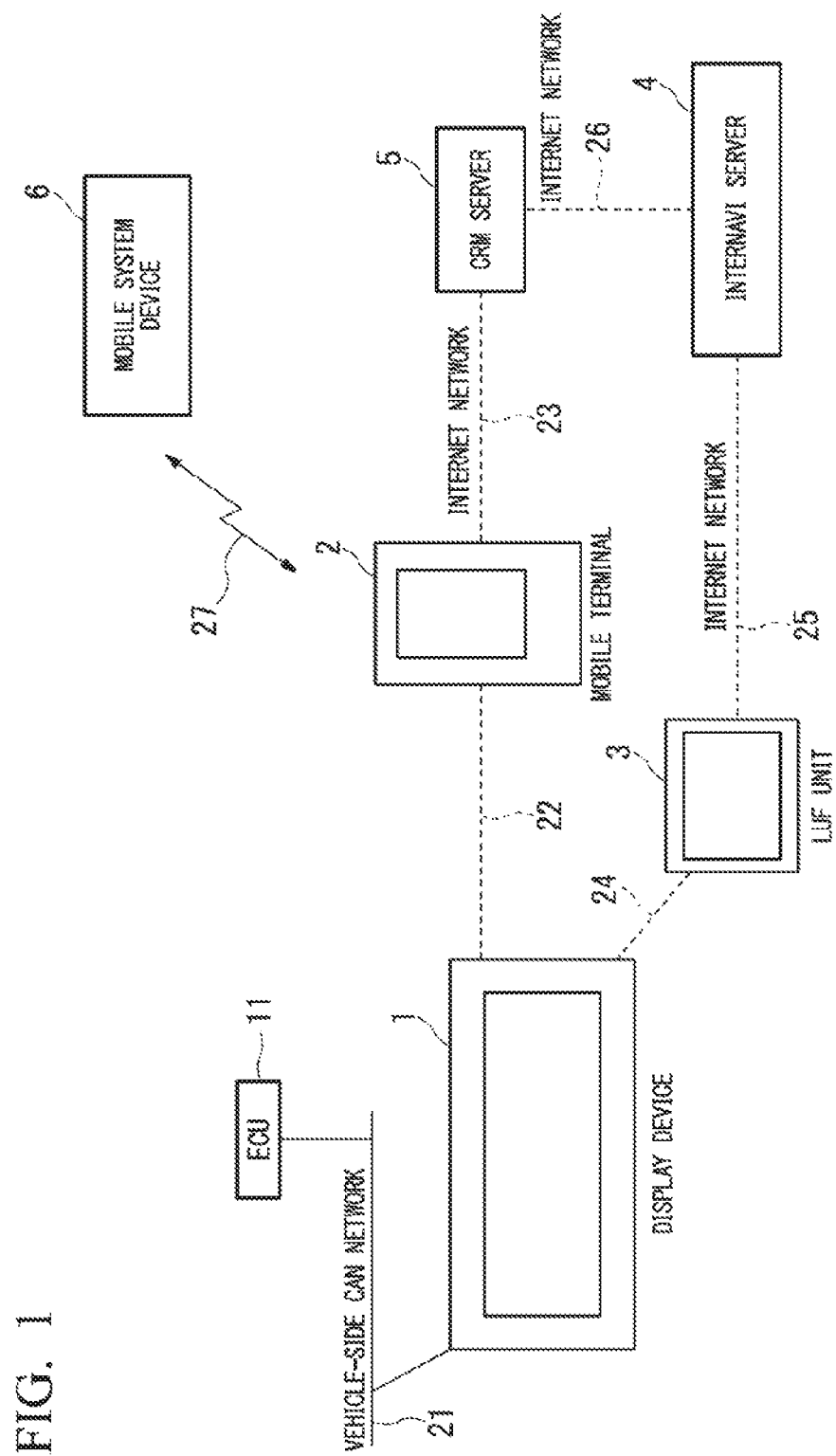
FIG. 1 is a diagram showing a schematic configuration of a communication system according to an embodiment of the present invention.

FIG. 1 is a diagram showing a schematic configuration of a communication system according to an embodiment of the present invention.

The communication system according to the present embodiment includes: a display device 1 (an example of in-vehicle unit); a mobile terminal 2; an LUF unit 3 (an example of communicator) as a unit of Link Up Free (LUF); an Internavi server 4 (an example of communicator-side device); a CRM server 5 (an example of information collection device) as a server of CRM (Customer Relationship Management); a mobile system device 6 as a device for a mobile system; and an electronic control unit 11 (ECU).

For the mobile terminal 2, a variety of devices may be used. By way of example, a smartphone may be used. As another example, a mobile phone terminal other than a smartphone, or alternatively, a mobile computer terminal or the like may be used.

Furthermore, the communication system according to the present embodiment includes: a vehicle-side CAN (Controller Area Network) network 21 as a line that connects between the display device 1 and the ECU 11; a short-distance connection line 22 as a line that connects between the display device 1 and the mobile terminal 2; an Internet network 23 as a line that connects between the mobile terminal 2 and the CRM server 5; a short-distance connection line 24 as a line that connects between the display device 1 and the LUF unit 3; an Internet network 25 as a line that connects between the LUF unit 3 and the Internavi server 4; an Internet network 26 as a line that connects between the Internavi server 4 and the CRM server 5; and a mobile network 27 as a line that connects between the mobile terminal 2 and the mobile system device 6.

Note that each line may be wired, wireless, or a combination of wired and wireless.

Furthermore, as the short-distance connection lines 22, 24, each of the lines may have other configuration other than that for a short distance (namely, the length of the line is optional).

Here, the display device 1, the ECU 11, and the vehicle-side CAN network 21 are for use in motor vehicles, and are provided in a motor vehicle (a car, for example). Each of these is provided before shipment by way of example, but may be added after shipment by way of another example.

As the vehicle-side CAN network 21, for example a B-CAN, which achieves comparatively slow communication speed, and an F-CAN, which achieves comparatively fast communication speed, are available.

The display device 1 is a device provided with a display screen. By way of example of the display device 1, a device of Display Audio may be used. The Display Audio includes, for example, one without a function of an automotive navigation system, one with a function of an automotive navigation system, and one with an AV function (a function about at a level of that of an AM/FM radio).

The mobile terminal 2 is one to be carried by a user (a driver of the motor vehicle, for example) with him or her. In the present embodiment, the mobile terminal 2 is taken into the motor vehicle, and is communicably connected to the display device 1 over the short-distance connection line 22.

As the short-distance connection line 22, a variety of connection lines may be used. For example, Bluetooth (registered trademark) or its SPP (Serial Port Profile) may be used.

The LUF unit 3 is a unit with an LUF function. By way of example, a USB (Universal Serial Bus) in which the LUF function is contained may be used.

As the short-distance connection line 24, a variety of connection lines may be used. By way of example, if the LUF unit 3 is a USB, a connection line of the USB may be used.

The Internavi server 4 and the CRM server 5 are provided by, for example, those who provide the service of LUF or CRM.

The Internet network 23 and the Internet network 25 are, for example, wireless lines.

Furthermore, for the Internet network 23, the Internet network 25, and the Internet network 26, the same network is used, for example. Note that, instead of the Internet networks 23, 25, and 26, a variety of networks may be used.

The mobile system device 6 is, for example, a server provided for a mobile system, and is communicably connected to the mobile terminal 2 over the mobile network 27. Note that the mobile system device 6 communicates with the mobile terminal 2 via, for example, a station device that wirelessly communicates with the mobile terminal 2. Furthermore, as the mobile system, for example a mobile phone system or the like may be used.

Note that, by way of example, it is possible to use a 3G line both for the communication between the LUF unit 3 and the Internavi server 4 and for the communication between the mobile terminal 2 and the mobile system device 6.
[Outline of Operation of Communication System According to the Present Embodiment]

An ECU 11 detects information related to a state (condition) of the motor vehicle provided with the ECU 11 (vehicle-related information), and sends the detected vehicle-related information to the display device 1 as CAN information over the vehicle-side CAN network 21.

Here, as the vehicle-related information, for example information related to various troubles that occur in the motor vehicle (trouble information) is used. As trouble information, a diagnostic trouble code (DTC) may be used, by way of example. Furthermore, the trouble information may include information related to freezing (such as stalling of processing) of a given portion that occurs in the motor vehicle (freeze information).

Note that, as the ECU 11, separate ECUs may be provided at a plurality of sites of the motor vehicle (for example, the battery, the engine, and the like) to detect troubles that occur at the sites.

The display device 1 receives the vehicle-related information, which has been sent from the ECU 11, over the vehicle-side CAN network 21.

Furthermore, the display device 1 has: a function of sending the received vehicle-related information to the mobile terminal 2 over the short-distance connection line 22; and a function of sending the received vehicle-related information to the LUF unit 3 over the short-distance connection line 24. In the present embodiment, if, out of the mobile terminal 2 and the LUF unit 3, only the mobile terminal 2 is connected to the display device 1, then the display device 1 sends the vehicle-related information to the mobile terminal 2. If only the LUF unit 3 is connected to the display device 1, then the display device 1 sends the vehicle-related information to the LUF unit 3. If both of the mobile terminal 2 and the LUF unit 3 are connected to the display device 1, then the display device 1 sends the vehicle-related information preferentially to the mobile terminal 2, and does not send the vehicle-related information to the LUF unit 3.

Here, as the function of sending the vehicle-related information in the display device 1, it is possible to utilize or apply the CRM function. The CRM function is a function of collecting the CAN information (the vehicle-related information, in the present embodiment) and sending the collected information to an external device toward an external server (the CRM server 5, in the present embodiment).

Furthermore, in the present embodiment, the display device 1 does not have a function of analyzing the vehicle-related information (trouble information, in the present embodiment).

Note that, in the present embodiment, the display device 1 has a function of outputting various pieces of information to the user (the driver of the motor vehicle, by way of example) by means of a display output on the display screen and/or an audio output from a speaker according to an instruction received from the mobile terminal 2 over the short-distance connection line 22. By way of example, it is possible to cause the information that is displayed on the screen of the mobile terminal 2 to be displayed on the larger display screen of the display device 1 in a replaced manner or an additional manner.

Furthermore, in the present embodiment, the display device 1 is provided with an operation portion such as a touchscreen, to which an instruction or the like according to an operation by the user (the driver of the motor vehicle, by way of example) is input. It is possible to send the instruction or the like, which has been input, to the mobile terminal 2 over the short-distance connection line 22.

Furthermore, in the present embodiment, if the processing of outputting (sending) the vehicle-related information to the outside and the processing of inputting (receiving) information from the outside overlap, then the display device 1 may have, for example, a function of giving preference to the output.

The mobile terminal 2 analyzes the vehicle-related information (the trouble information, in the present embodiment) that has been received from the display device 1 over the short-distance connection line 22.

As the processing of this analysis, for example the processing of diagnosing a trouble of a motor vehicle may be used.

Furthermore, as information about this analysis result, for example information showing an analysis result may be used. By way of example, information obtained by processing the vehicle-related information according to the analysis result may be used.

Furthermore, in the case where a part of information included in the vehicle-related information is extracted and the extracted information is analyzed, the processing of the analysis may include the processing of extracting a part of information included in the vehicle-related information.

The mobile terminal 2 has a function of sending the information about the analysis result to the display device 1 over the short-distance connection line 22. As a result, it is possible to cause the display screen of the display device 1 to display the analysis result by the mobile terminal 2 (for example, details of the trouble, a message showing a solution to the trouble, or the like) and to cause the analysis result by the mobile terminal 2 to be output by sound.

Furthermore, the mobile terminal 2 has a function of sending the vehicle-related information (or information about the analysis result thereof), which has been received from the display device 1 over the short-distance connection line 22, to the CRM server 5 over the Internet network 23.

Note that, in the case where the mobile terminal 2 sends the vehicle-related information to the CRM server 5, the processing of the analysis thereof may be performed at any time before or after the sending.

Here, the mobile terminal 2 has a function of analyzing the vehicle-related information (the trouble information, in the present embodiment). The function of analyzing the vehicle-related information is implemented by, for example, a predetermined application (program) previously stored in the mobile terminal 2 or a predetermined application (program) downloaded into the mobile terminal 2.

By way of example, the mobile system device 6 has a function of providing an application that analyzes the vehicle-related information, and causes the mobile terminal 2 to download the application. As a result, the mobile terminal 2 is capable of updating the application to be stored and used. With this updating of an application (updating of software), the mobile terminal 2 is capable of adding (extending) or modifying, for example: the design of the screen that displays motor vehicle trouble information, CRM, or information; and the shifting (switching) of the screens that displays information, without changing the hardware.

Furthermore, in the present embodiment, the mobile terminal 2 is capable of storing information such as: details of vehicle-related information that has been received from the display device 1; temporal information such as its reception date and time (for example, the date and time of the occurrence of the trouble); and details of the analysis result thereof. The mobile terminal 2 may have a function of storing, for example, a log of the vehicle-related information (or information about the analysis result thereof) in non-volatile memory or the like.

The LUF unit 3 sends the vehicle-related information (the trouble information, in the present embodiment), which has been received from the display device 1 over the short-distance connection line 24, to the Internavi server 4 over the Internet network 25.

Furthermore, the LUF unit 3 has a function of sending information about the analysis result of the vehicle-related information, which has been received from the Internavi server 4 over the Internet network 25, to the display device 1 over the short-distance connection line 24. As a result, in the display device 1, the information about the analysis result is displayed on the display screen and/or is output in sound.

Here, in the present embodiment, the LUF is a service of wireless communication that is provided by a provider of LUF (for example, a company that sells motor vehicles) and that allows the users to utilize free of charge.

As is the case with the present embodiment, the user (the driver of the motor vehicle, by way of example) may use a unit dedicated to the LUF (the LUF unit 3), or by way of another example, the function of the LUF unit 3 may be provided integrally with the display device 1.

The Internavi server 4 analyzes the vehicle-related information that has been received from the LUF unit 3 over the Internet network 25.

The Internavi server 4 has a function of sending the information about the analysis result thereof to the LUF unit 3 over the Internet network 25.

Furthermore, the Internavi server 4 has a function of sending the vehicle-related information (or the information about the analysis result thereof), which has been received from the LUF unit 3 over the Internet network 25, to the CRM server 5 over the Internet network 26.

Note that, in the case where the Internavi server 4 sends the vehicle-related information to the CRM server 5, the processing of the analysis thereof may be performed at any time before or after the sending.

Here, the processing of the analysis of the vehicle-related information which is performed in the mobile terminal 2 is the same as that of the analysis of the vehicle-related information which is performed in the Internavi server 4. However, for example, the processings may be substantially the same, and may be different in data format or the like.

Note that the LUF (the Internavi server 4, in the present embodiment) does not have a function of accumulating the logs of the vehicle-related information (or the information about the analysis result thereof) due to, for example, the limitation of nonvolatile memory in terms of hardware. The LUF only uploads the vehicle-related information (or the information about the analysis result thereof) to the CRM server 5.

As another exemplary configuration, the Internavi server 4 may have no function of analyzing the vehicle-related information.

In the present embodiment, the function of the LUF is provided mainly for the users who do not have a mobile terminal 2 (a smartphone, by way of example).

Furthermore, in the case of, for example, a light motor vehicle that is not provided with a function of the LUF, the user is capable of utilizing the mobile terminal 2 to upload information (for example, vehicle-related information or information about the analysis result thereof).

The CRM server 5 stores: the information (the vehicle-related information or the information about the analysis result thereof) that has been received from the mobile terminal 2 over the Internet network 23; and the information (the vehicle-related information or the information about the analysis result thereof) that has been received from the Internavi server 4 over the Internet network 26. In the present embodiment, the CRM server 5 is a device for collecting these pieces of information, and stores them collectively (for example, in a mixed manner without discrimination).

As another exemplary configuration, the CRM server 5 or another device (not shown in the figure) connected thereto may have a function of analyzing the vehicle-related information.

Note that the format of the information to be sent from the mobile terminal 2 to the CRM server 5 may be the same as or different from that of the information to be sent from the Internavi server 4 to the CRM server 5. By way of example, in the case where a smartphone is used as the mobile terminal 2, JSON (JavaScript (registered trademark) Object Notation) may be used as a format of information that is to be sent from the mobile terminal 2 to the CRM server 5. Furthermore, as a format of information that is to be sent from the Internavi server 4 to the CRM server 5, XML (Extensible Markup Language) may be used. In general, compared with XML, JSON is capable of maintaining the communication traffic of data less heavy.

By way of example, as a configuration portion that detects and notifies the vehicle-related information by means of the ECU 11 and the vehicle-side CAN network 21, as a configuration portion that performs the processing of the LUF by means of the short-distance connection line 24, the LUF unit 3, the Internet network 25, the Internavi server 4, and the Internet network 26, and as a configuration portion that collects information by means of the CRM server 5, it is possible to use similar ones to those generally known, respectively.

Furthermore, by way of example, as the mobile terminal 2 (here, the mobile terminal itself exclusive of applications), as the short-distance connection line 22, as the Internet network 23, and as the mobile network 27, it is possible to use similar ones to those generally known, respectively. Note that, in the mobile terminal 2, for example a predetermined application for implementing the function according to the present embodiment is used.

Furthermore, by way of example, as the mobile system device 6 itself, it is possible to use an existing one. Note that, in the present embodiment, the mobile system device 6 has a function of providing a predetermined application that causes the mobile terminal 2 to implement the function according to the present embodiment.

[Specific Example of Display Device According to the Present Embodiment]

Figure 2:
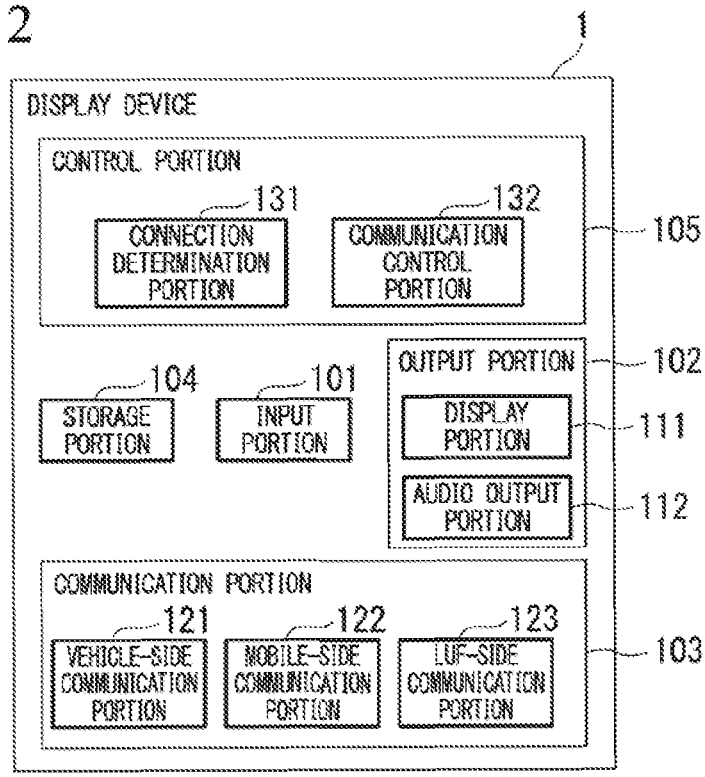
FIG. 2 is a block diagram showing a schematic configuration of a display device according to the embodiment of the present invention.

FIG. 2 is a block diagram showing a schematic configuration of the display device 1 according to the embodiment of the present invention.

The display device 1 according to the present embodiment includes: an input portion 101; an output portion 102; a communication portion 103; a storage portion 104; and a control portion 105.

The output portion 102 includes: a display portion 111; and an audio output portion 112.

The communication portion 103 includes: a vehicle-side communication portion 121; a mobile-side communication portion 122; and an LUF-side communication portion 123 (an example of communicator-side communication portion).

The control portion 105 includes: a connection determination portion 131; and a communication control portion 132.

As the input portion 101, for example an operation portion to which various instructions and pieces of information that are operated by the user are input. As an operation portion, a touchscreen provided on the screen (for example, a screen of the display portion 111) may be used, by way of example, or alternatively, keys (not those under a touchscreen system) or a mouse may be used, by way of another example. Note that, the input portion 101 may not be provided if not required.

The output portion 102 outputs various pieces of information.

The display portion 111 has a screen, and outputs various pieces of information to and displays various pieces of information on the screen.

The audio output portion 112 outputs a variety of sounds.

The communication portion 103 communicates various signals (information).

The vehicle-side communication portion 121 communicates signals (information) between itself and the ECU 11 over the vehicle-side CAN network 21.

The mobile-side communication portion 122 communicates signals (information) between itself and the mobile terminal 2 over the short-distance connection line 22. The mobile-side communication portion 122 manages whether it is in communicable connection between itself and the mobile terminal 2 over the short-distance connection line 22 or not.

The LUF-side communication portion 123 communicates signals (information) between itself and the LUF unit 3 over the short-distance connection line 24. The LUF-side communication portion 123 manages whether it is in communicable connection between itself and LUF unit 3 over the short-distance connection line 24 or not.

The storage portion 104 stores various pieces of information. The storage portion 104 stores, for example, the information about a program that is executed by the control portion 105 and the information about a variety of parameters that are used in the processing of the program.

The control portion 105 executes predetermined programs by means of the CPU (Central Processing Unit) and the like, to thereby perform various types of control.

The connection determination portion 131 determines the connection status of the mobile terminal 2 and the connection status of the LUF unit 3. To be more specific, based on the managerial details of the mobile-side communication portion 122 and on the managerial details of the LUF-side communication portion 123, the connection determination portion 131 determines the connection statuses of the mobile terminal 2 and the LUF unit 3, namely, whether only the mobile terminal 2 is connected or not, whether only the LUF unit 3 is connected or not, or whether both of the mobile terminal 2 and the LUF unit 3 are connected or not.

As for the mobile terminal 2 and the LUF unit 3, if determining, based on the determination result by the connection determination portion 131, that only the mobile terminal 2 is connected, then the communication control portion 132 sends the vehicle-related information to the mobile terminal 2 by means of the mobile-side communication portion 122. If it is determined that only the LUF unit 3 is connected, then the communication control portion 132 sends the vehicle-related information to the LUF unit 3 by means of the LUF-side communication portion 123. If it is determined that both of the mobile terminal 2 and the LUF unit 3 are connected, then the communication control portion 132 performs control so as to send the vehicle-related information preferentially to mobile terminal 2 by means of the mobile-side communication portion 122, and so as not to send the vehicle-related information to the LUF unit 3.

Furthermore, the control portion 105 performs control so as to output the information, which has been received from the display device 1 and the LUF unit 3, by means of the display portion 111 and/or the audio output portion 112.

Here, several processings performed in the display device 1 according to the present embodiment have been described with reference to FIG. 2. However, a variety of processings other than these may performed.

[Specific Example of Mobile Terminal According to Present Embodiment]

Figure 3:
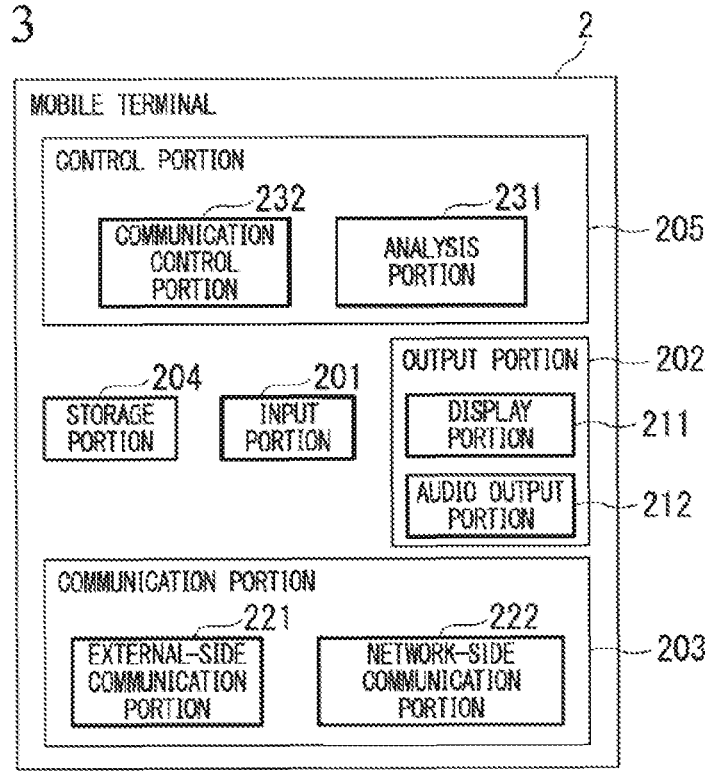
FIG. 3 is a block diagram showing a schematic configuration of a mobile terminal according to the embodiment of the present invention.

FIG. 3 is a block diagram showing a schematic configuration of the mobile terminal 2 according to the embodiment of the present invention.

The mobile terminal 2 according to the present embodiment includes: an input portion 201; an output portion 202; a communication portion 203; a storage portion 204, and a control portion 205.

The output portion 202 includes: a display portion 211; and an audio output portion 212.

The communication portion 203 includes: an external-side communication portion 221; and a network-side communication portion 222.

The control portion 205 includes: an analysis portion 231; and a communication control portion 232.

As the input portion 201, for example an operation portion to which various instructions and pieces of information that are operated by the user are input. As an operation portion, a touchscreen provided on the screen (for example, a screen of the display portion 211) may be used, by way of example, or alternatively, keys (not those of a touchscreen system) or a mouse may be used, by way of another example.

The output portion 202 outputs various pieces of information.

The display portion 211 has a screen, and outputs and displays various pieces of information to and on the screen.

The audio output portion 212 outputs a variety of sounds.

The communication portion 203 communicates various signals (information).

The external-side communication portion 221 communicates signals (information) between itself and the display device 1 over the short-distance connection line 22.

Furthermore, the external-side communication portion 221 communicates signals (information) between itself and the CRM server 5 over the Internet network 23.

The network-side communication portion 222 communicates signals (information) between itself and mobile system device 6 over the mobile network 27.

The storage portion 204 stores various pieces of information. The storage portion 204 stores, for example, the information about a program that is executed by the control portion 205 and the information about a variety of parameters that are used in the processing of the program.

The control portion 205 executes predetermined programs by means of the CPU and the like, to thereby perform a variety of control.

If the vehicle-related information is received from the display device 1 by means of the external-side communication portion 221, then the analysis portion 231 analyzes the received vehicle-related information. The analysis portion 231 performs the processing of this analysis by executing a predetermined application (program) for analysis.

The communication control portion 232 performs control so as to send the information about the analysis result by the analysis portion 231 to the display device 1 by means of the external-side communication portion 221.

Furthermore, the communication control portion 232 performs control so as to send one or both of the vehicle-related information that has been received from the display device 1 and the information about the analysis result by the analysis portion 231, to the CRM server 5 by means of the external-side communication portion 221.

Furthermore, the communication control portion 232 performs control so as to receive (download) a predetermined application from the mobile system device 6 by means of the network-side communication portion 222, and also performs control so as to store the received application in the storage portion 204 (if necessary, to update the already-stored application).

Here, several processings performed in the mobile terminal 2 according to the present embodiment have been described with reference to FIG. 3. However, a variety of processings other than these may be performed.

[Example of Processing in Display Device According to Present Embodiment]

Figure 4:
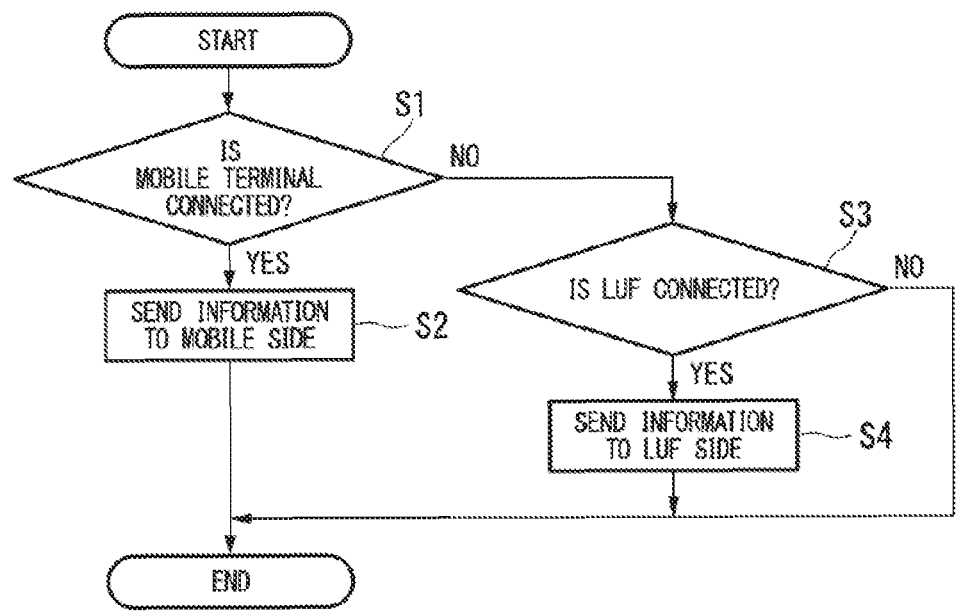
FIG. 4 is a flow chart showing the processing that is performed by the display device according to the embodiment of the present invention.

FIG. 4 is a flow chart showing processing that is performed by the display device 1 according to the embodiment of the present invention. The processing is performed under control by the control portion 105 in the display device 1.

At predetermined timing, in the display device 1, whether the mobile terminal 2 is connected or not is determined (step S1).

Here, as the predetermined timing, for example the timings of predetermined intervals, or the timing when vehicle-related information that is to be sent to the outside is produced may be used.

As a result of the determination in step S1, in the display device 1, if the mobile terminal 2 is determined to be in a connected state, then the vehicle-related information is sent to the mobile terminal 2 (step S2).

Therefore, in the display device 1 if that the mobile terminal 2 is determined to be in a connected state, then the vehicle-related information is sent preferentially to the mobile terminal 2, irrespective of the connection of the LUF unit 3.

On the other hand, as a result of the determination result of step S1, in the display device 1, if the mobile terminal 2 is determined to be in a non-connected state, then whether the LUF unit 3 is connected or not is determined (step S3).

As a result of the determination result of step S3, in the display device 1, if the LUF unit 3 is determined to be in a connected state, then the vehicle-related information is sent to the LUF unit 3 (step S4).

On the other hand, as a result of the determination result of step S3, in the display device 1, if the LUF unit 3 is determined to be in a non-connected state, then the vehicle-related information is not sent to the outside.

Here, in FIG. 4, an example is illustrated in which whether the LUF unit 3 is connected or not is determined after whether the mobile terminal 2 is connected or not is determined. However, by way of another example, the processing of determining whether the mobile terminal 2 is connected or not after determining whether the LUF unit 3 is connected or not may be used, or alternatively, the processing of determining whether the mobile terminal 2 is connected or not and the processing of determining whether the LUF unit 3 is connected or not may be performed in parallel.

[Example of Processing in Mobile Terminal According to Present Embodiment]

Figure 5:
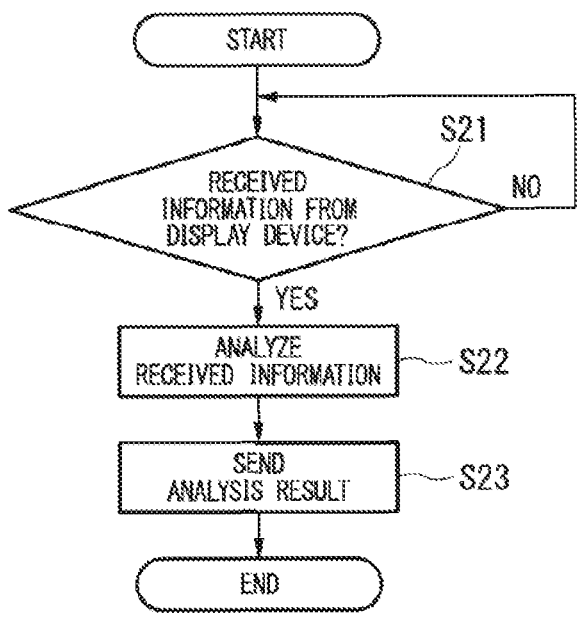
FIG. 5 is a flow chart showing the processing that is performed by the mobile terminal according to the embodiment of the present invention.

FIG. 5 is a flow chart showing processing that is performed by the mobile terminal 2 according to the embodiment of the present invention. This processing is performed under control of the control portion 205 in the mobile terminal 2.

The mobile terminal 2 monitors and determines whether the information (the vehicle-related information, in the present embodiment) has been received from the display device 1 or not (step S21).

As a result of the determination of step S21, if the mobile terminal 2 determines that the information has been received from the display device 1, then the mobile terminal 2 analyzes the received information (step S22).

Then, the mobile terminal 2 sends the information about the analysis result to a predetermined device (for example, to the display device 1 or the CRM server 5) (step S23).

Note that, if prescribed to send the vehicle-related information to the CRM server 5, then the mobile terminal 2 performs the processing.

[Example of Display of Diagnosis Result According to Present Embodiment]

Figure 6:
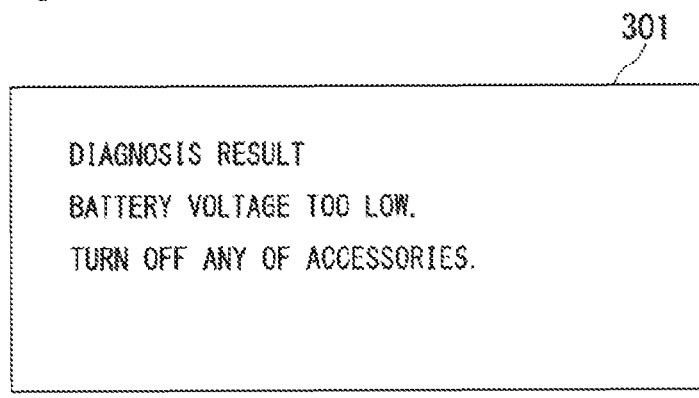
FIG. 6 is a diagram showing an example of displayed details of an analysis result by the mobile terminal according to the embodiment of the present invention.

FIG. 6 is a diagram showing an example of displayed details of a diagnosis result by the mobile terminal 2 according to the embodiment of the present invention. In the present example, as an analysis of the vehicle-related information, the mobile terminal 2 conducts a diagnosis on a trouble of the motor vehicle.

On the screen 301 shown in FIG. 6, a message "Battery voltage too low. Turn off any of accessories." is displayed as a diagnosis result. This diagnosis result is an example of result of the diagnosis on a battery trouble of the motor vehicle.

In the present embodiment, it is possible to display and output information about this diagnosis result on and to the screen of the display portion 211 of the mobile terminal 2, and to send the information about the diagnosis result from the mobile terminal 2 to the display device 1 and display it on the screen of the display portion 111 of the display device 1.

[Summary of Present Embodiment]

As described above, in the communication system according to the present embodiment, a display device 1 is mounted in a motor vehicle and obtains information related to the motor vehicle (vehicle-related information). As for a mobile terminal 2 with a function of analyzing the vehicle-related information and an LUF unit 3 (for example, one without the function of analyzing the vehicle-related information), if both of these are connected to the display device 1, then the display device 1 gives preference to the connection to the mobile terminal 2, and outputs (sends) the vehicle-related information to the mobile terminal 2.

Furthermore, as for the mobile terminal 2 and the LUF unit 3, if the mobile terminal 2 is not connected, then the display device 1 outputs (sends) the vehicle-related information to the LUF unit 3. Through this, the display device 1 sends the vehicle-related information to an Internavi server 4. The Internavi server 4 analyzes the vehicle-related information, which has been received from, for example, the display device 1 via the LUF unit 3.

Furthermore, the mobile terminal 2 analyzes the received vehicle-related information, and outputs (sends) the information related to the analysis result thereof to the display device 1. Based on the information related to the analysis result that has been received from the mobile terminal 2, the display device 1 outputs the information related to the diagnosis result of the trouble or the like in the form of display and/or sound, to thereby make its notification to the user.

Furthermore, the mobile terminal 2 is capable of sending the information related to the analysis result to a CRM server 5.

Furthermore, by downloading, from a mobile system device 6 (for example, an external server), an application with a function of analyzing vehicle-related information, the mobile terminal 2 is capable of updating the function of analyzing vehicle-related information.

As has been described above, according to the communication system of the present embodiment, it is possible to improve the simplicity of the display device 1 that is mounted in the motor vehicle. Furthermore, it is possible to improve the usability of the display device 1.

For example, in the present embodiment, the mobile terminal 2 has an analysis function for vehicle-related information, and the display device 1 does not need to have the analysis function. Therefore, it is possible to make the configuration simple. As a specific example, the communication system may have a configuration in which the display device 1 outputs (sends) the vehicle-related information, which has been obtained in the motor vehicle, to the outside (for example, the mobile terminal 2 and/or the LUF unit 3) without analyzing it. Furthermore, as a specific example, the communication system may have a configuration in which the display device 1 outputs the information, which is input (received) from the outside (for example, the mobile terminal 2 and/or the LUF unit 3), as it is (for example, outputs the information in display and/or in sound), without making an analysis of the vehicle-related information or performing control for the notification of the analysis result in the own device (the display device 1).

Here, in the present embodiment, by way of example of an in-vehicle unit, the display device 1 has been used. However, as another example of in-vehicle unit, various ones may be used. Furthermore, in the present embodiment, as for the configuration of the in-vehicle unit, it is designed to make the configuration simple. However, as another example of configuration, the present invention may be applied to an in-vehicle unit with various optional functions.

[Pertaining to Above Embodiment]

While an embodiment of the present invention has been described in detail above with reference to the drawings. However, the specific configuration is not limited to this embodiment, and various design modifications and the like without departing from the spirit or scope of the present invention are also included.

Furthermore, as for the present invention, inventions in various categories such as devices (an in-vehicle unit and the like), systems (a communication system and the like), methods (a communication method and the like), and programs may be provided.

Furthermore, a program for implementing the functions of the individual devices (for example, the display device 1, the mobile terminal 2, and the like) according to the above embodiment is recorded in a recording medium readable by computers. Then, the program recorded in the recording medium is caused to be read by a computer system and is executed. Thereby, it is possible to perform the processing.

Note that the "computer system" here may include an Operating System (OS) and hardware such as a peripheral device.

Furthermore, the "recording medium readable by computers" refers to: a writable nonvolatile memory such as a flexible disk, a magneto optical disk, a ROM (Read Only Memory), and a flash memory; a portable medium such as a DVD (Digital Versatile Disk); and a storage device such as a hard disk built in a computer system.

Furthermore, the "recording medium readable by computers" includes those that retain a program for a given period of time such as a volatile memory (for example, DRAM (Dynamic Random Access Memory)) in a computer system that functions as a server or a client in the case where the program is sent over a network such as the Internet or over a communication line such as a telephone line.

Furthermore, the aforementioned program may be transmitted from a computer system that stores the program in a storage device or the like to another computer system via a transmission medium or through transmission waves in a transmission medium. Here, the "transmission medium" that transmits a program refers to a medium with a function of transmitting information, for example a network (a communication network) such as the Internet, or a communication line (a communication channel) such as a telephone line.

Furthermore, the aforementioned program may be one for implementing a part of the aforementioned function. Furthermore, the aforementioned program may be one that is capable of achieving the aforementioned function by being combined with a program already recorded in the computer system, namely, may be a difference file (a difference program).

BRIEF DESCRIPTION OF THE REFERENCE SYMBOLS

1: display device (an example of in-vehicle unit)
2: mobile terminal
3: LUF unit (an example of communicator)
4: Internavi server (an example of communicator-side device)
5: CRM server (an example of information collection device)
6: mobile system device
11: electronic control unit (ECU)
21: vehicle-side CAN network
22: short-distance connection line
23: Internet network
24: short-distance connection line
25: Internet network
26: Internet network
27: mobile network
101: input portion
102: output portion
103: communication portion
104: storage portion
105: control portion
111: display portion
112: audio output portion
121: vehicle-side communication portion
122: mobile-side communication portion
123: LUF-side communication portion (an example of communicator-side communication portion)
131: connection determination portion
132: communication control portion
201: input portion
202: output portion
203: communication portion
204: storage portion
205: control portion
211: display portion
212: audio output portion
221: external-side communication portion
222: network-side communication portion
231: analysis portion
232: communication control portion
301: screen

The invention claimed is:

1. A communication system, comprising:
an in-vehicle unit; a mobile terminal; and a predetermined communicator,
wherein the in-vehicle unit
is configured to determine a connection state of the mobile terminal and a connection state of the communicator,
is configured to send information related to a motor vehicle to the mobile terminal if it is determined that only the mobile terminal is connected,
is configured to send the information related to the motor vehicle to the communicator if it is determined that only the communicator is connected, and
is configured to send the information related to the motor vehicle to the mobile terminal, and is configured to not send the information related to the motor vehicle to the communicator if it is determined that both of the mobile terminal and the communicator are connected,
wherein the mobile terminal is configured to analyze the information related to the motor vehicle, which has been received from the in-vehicle unit, and is configured to send information related to an analysis result thereof to the in-vehicle unit, and is configured to send the information related to the motor vehicle, which has been received from the in-vehicle unit, or the information related to the analysis result thereof to a predetermined information collection device, and wherein the communicator is configured to send the information related to the motor vehicle, which has been received from the in-vehicle unit, to a predetermined communicator-side device that is provided on a side of the information collection device.

2. The communication system according to claim 1,
wherein the mobile terminal is configured to update an application by downloading the application with a function of analyzing the information related to the motor vehicle from a predetermined mobile system device.

3. A communication method, comprising:
a first step of receiving information related to a motor vehicle in a vehicle-side communication portion provided in an in-vehicle unit;
a second step of determining whether only a mobile terminal is connected or not, whether only a communicator is connected or not, or whether both of the mobile terminal and the communicator are connected or not, regarding a connection state of the mobile terminal with a function of analyzing information related to a motor vehicle and a connection state of the predetermined communicator to the in-vehicle unit in a connection determination portion provided in the in-vehicle unit; and a third step of performing control
that is configured to send the information related to the motor vehicle, which has been received by the vehicle-side communication portion, to the mobile terminal if it is determined that only the mobile terminal is connected, by the connection determination portion,
that is configured to send the information related to the motor vehicle, which has been received by the vehicle-side communication portion, to the communicator if it is determined that only the communicator is connected, by the connection determination portion,
that is configured to send the information related to the motor vehicle, which has been received by the vehicle-side communication portion, to the mobile terminal, and is configured to not send the information related to the motor vehicle, which has been received by the vehicle-side communication portion, to the communicator, if it is determined that both of the mobile terminal and the communicator are connected, by the connection determination portion in a communication control portion provided in the in-vehicle unit.

\* \* \* \* \*